Patented Nov. 26, 1935

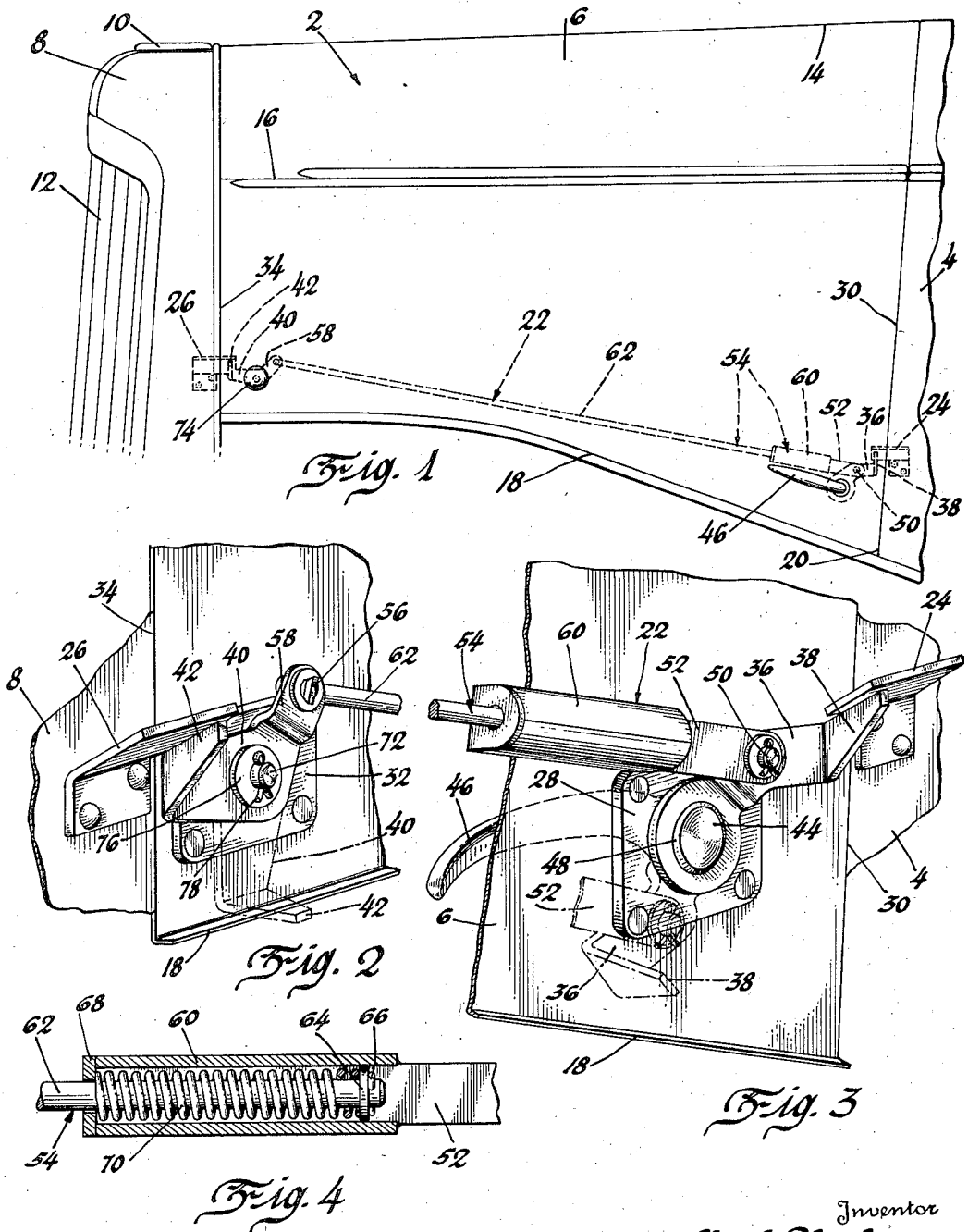

2,022,104

UNITED STATES PATENT OFFICE 2,022,104

HOOD LATCH

Lloyd Blackmore, Detroit, Mich., assignor to General Motors Corporation, Detroit, Mich., a corporation of Delaware Application July 8, 1933, Serial No. 679,466

3 Claims. (Cl. 292—48)

This invention relates to devices for holding down the hoods of automotive vehicles and is particularly adapted to vehicles which have the lower hood edge either inclined or curved.

In modern automotive practice there is the trend toward filling in the ravine between the front fender and hood which necessitates the hood having a lower edge which is either curved or inclined and having its rear portion much lower than the front portion. This has necessitated a change in the type of hood latch used. Where a hood latch was used which had a single handle to operate two hooks, the handle has been placed at the center, but with the modern constructions mentioned it has been found that this latching arrangement is not as practical and desirable as with the old hood structures. It is therefore the object of the invention to construct a hood latch which is operable by a single handle from one end of the hood, preferably the rear, to hook or unhook the hood latches at both the cowl and the radiator shell.

The object of the invention is accomplished by swingably mounting two hook members, one at the front and one at the rear of the hood at the inside thereof. The hook members are joined by means of a rod which has a spring intermediate its length which spring is placed under compression when the hooks are in latching position. An operating handle is rigidly mounted on the pivot of one of the hooks and by turning the handle both hooks are operated. The other hook has secured to its pivot member a second handle or knob which may be pivotally mounted and turned to operate the hood latch rigidly secured thereto but as this knob or handle is at the front and relatively difficult of access, it will be but little used insofar as the operation of the hood latch is concerned, but it aids in enabling the hood to be raised. Preferably the knob is rigidly mounted with the hook pivoted thereon.

On the drawing

Figure 1 is a side view of the hood of an automotive vehicle showing in dotted lines the application of the invention.

Figures 2 and 3 show enlarged detailed views of the latching mechanism looking from the inside of the hood but on the side opposite to that shown in Figure 1. The full lines show the latched position, and the dotted lines the unlatched position.

Figure 4 is a detailed view of the portion of the connecting rod having the coil spring.

Referring to the drawing, the numeral 2 indicates an automotive vehicle having the cowl 4, hood 6, radiator shell 8, radiator cap 10, and radiator grill 12. The hood 6 is hinged along the lines 14 and 16 as is customary. The parts so far described are conventional, and per se form no part of the invention.

In contradistinction to prior constructions, the lower edge 18 of the hood is shown as curved to conform to the curve of the front fender where it joins onto the front portion of the vehicle. In prior constructions the lower edge 18 was straight and much lower down, in fact it was lower than the rearmost corner 20 of the hood. The curved or inclined shape of the rear edge 18 has necessitated a latching mechanism, indicated as a whole at 22, which has one of its members or hooks much higher than the other.

A rear bracket 24 is shown secured to the cowl and a front bracket 26 is shown secured to the radiator shell. A bracket 28 is secured to the inside of the hood at the rear edge 30 and a second bracket 32 is secured to the hood at the front edge 34. Pivoted on a stud 44 mounted in the rear bracket 28 is the hook 36 having the bent end 38 for engagement with the bracket 24. Pivoted on a stud 72 mounted in the front bracket 32 is the hook 40 having the bent end 42 for engagement with the bracket 26. The rear hook 36 is pivoted on the stud portion 44 of the handle 46. The handle portion 46 is outside the hood and extends through an opening in the bracket 28 and has the end of the stud portion 44 spun over as indicated at 48 to hold the hook 36 in position.

The hook 36 has an opening intermediate its ends for the reception of a pivot bolt 50 to which there is pivoted the connector 52 forming a part of a link 54 which extends to the hook 40 and is pivoted at 56 to an arm 58 on the hook 40. The connector 52 has the housing portion 60 integral therewith as is best shown in Figure 4. The rod 62 of the link 54 extends into the housing and has a washer 64 held on its end by means of a pin or key 66. Between the washer 64 and the end 68 of the housing 60 there is confined a coil spring 70 which is under compression when the parts are in the position shown in Figures 1, 2, and 3 so that the spring will push against both the bracket 52 and washer 64, tending to shorten the link 54 and thereby tightly hold the hooks 36 and 40 against their respective brackets 24 and 26.

The hook 40 is pivotally mounted on the bracket 32 by means of the stud portion 72 formed on the end of a handle 74, the handle being on the outside of the hood and the stud portion projecting through an opening in the bracket 42 pivotally to mount the hook 40. A washer 76 and cotter pin 78 through the stud 72 hold the handle 74 in position and hold the hook 40 in place.

The handle 74 will be positioned at the front part of the vehicle and as the front fenders will be higher and will extend to the line 18 to fill the usual ravine, the handle 74 will be somewhat inconvenient to operate. When the operator, therefore, desires to release the hooks 36 and 40 from their brackets he will swing the handle 46 clockwise from the position in Figure 1 to throw the hooks 36 and 40 to the dotted line position of Figures 2 and 3. The movement of the handle 46 will cause the hooks to swing free of their keepers and throw the link 54 and hooks 36 and 40 from the full line position shown in Figures 2 and 3 to the dotted line position on the opposite side of the axis of movement of the hook 36 so that the spring 70 will be gradually released from compression to cause it to telescope the rod 62 in the bracket 52 to hold the hooks in the dotted line position shown in Figures 2 and 3. The operator now raises the hood by using the handle 46 only, or both the handles 46 and 74. The handle 74 may be journaled in the bracket 32 and the hook 40 rigidly mounted on the stud 72 and while the handle 74 is not as convenient to turn to operate the latch in position, nevertheless it is of great convenience in aiding the operator in raising the hood. When it is desired to relatch the hood, the hood is lowered and the handle 46 swung counterclockwise to bring the parts back to the position shown in Figure 1. The spring 70 will be placed under compression tightly to hold the hooks against the brackets 24 and 26.

I claim:

1. In a latching device for the hoods of automotive vehicles, two hooks pivotally mounted on the inside of the hood and adapted to be moved into or out of engagement with keepers on the vehicle to lock or release the hood, a link of limited extensible resiliency pivoted to both hooks to cause the hooks to move in unison said link including a spring to cause the hooks tightly to engage the keepers when the hood is in latched position, and a handle outside the hood and secured to one of the hooks to operate the latching device from the outside of the hood.

2. In a latching device for the hoods of automotive vehicles, two hooks pivotally mounted on the inside of the hood and adapted to be moved into or out of engagement with keepers on the vehicle to lock or release the hood, a link of limited extensible resiliency pivoted to both hooks to cause the hooks to move in unison, said link comprising a rod secured to one hook, a connector secured to the other hook, and a spring between the rod and connector, and a handle outside the hood and rigidly secured to one of the hooks to operate the latching device from the outside of the hood.

3. In a latching device for the hoods of automotive vehicles, a plurality of hooks inside the vehicle adapted to be moved to engage keepers on the vehicle, a handle outside the hood attached to a first hook and adapted to move the same to cause the hook to be engaged with or disengaged from the keeper, operating means attached at one of its ends to said first hook and at its other end to the other hook, the movement of said handle causing said means to move the second hook simultaneously with the first, and resilient means in said first named means to cause said hooks tightly to engage their keepers with independent resiliency when the hooks are in latched position.

LLOYD BLACKMORE.